US006176083B1

(12) United States Patent
Ikari

(10) Patent No.: US 6,176,083 B1
(45) Date of Patent: Jan. 23, 2001

(54) APPARATUS AND METHOD FOR CONTROLLING DISPLACEMENT OF STEERING PUMP FOR WORK VEHICLE

(75) Inventor: Masanori Ikari, Saitama (JP)

(73) Assignee: Komatsu Ltd., Tokyo (JP)

( * ) Notice: Under 35 U.S.C. 154(b), the term of this patent shall be extended for 0 days.

(21) Appl. No.: 09/173,599

(22) Filed: Oct. 15, 1998

(30) Foreign Application Priority Data

Oct. 15, 1997 (JP) .................................................. 9-299495

(51) Int. Cl.[7] ...................................................... F16D 31/02

(52) U.S. Cl. ................................ 60/422; 60/450; 60/452; 60/327

(58) Field of Search .............................. 60/422, 450, 452

(56) References Cited

U.S. PATENT DOCUMENTS 4,034,563 * 7/1977 Orth ....................................... 60/422
4,043,419 * 8/1977 Larson et al. ...................... 60/420 X
4,343,151 * 8/1982 Lorimer ................................ 60/422
4,454,716 * 6/1984 Rau ....................................... 60/422
4,470,259 * 9/1984 Miller et al. .......................... 60/422
4,470,260 * 9/1984 Miller et al. .......................... 60/422
4,663,936 * 5/1987 Morgan ................................. 60/422
4,665,695 * 5/1987 Rau et al. ......................... 60/422 X
5,056,311 * 10/1991 Tischer .............................. 60/422 X
5,927,072 * 7/1999 Vannette ................................ 60/452

FOREIGN PATENT DOCUMENTS 3-186600 8/1991 (JP) .

* cited by examiner

*Primary Examiner*—John E. Ryznic
(74) *Attorney, Agent, or Firm*—Sidley & Austin

(57) ABSTRACT

In an apparatus and a method for controlling the displacement of a steering pump for a work vehicle, the pressure loss can be decreased and the discharge of the steering pump can effectively be utilized even in a simultaneous operation with a work machine. The apparatus includes a steering gear preference flow-dividing valve (20) for supplying an oil quantity from the discharge of the steering pump (2) to a steering operation valve, so that the differential pressure between the input pressure and output pressure of the meter-in opening of the steering operation valve (10) is kept constant. The residual oil quantity is supplied to a work-machine operation valve (17, 18). The operation degree detection means (24), for detecting a degree of operation of the work-machine operation valve, and a work-machine oil-quantity control valve (25) are disposed between the steering gear preference flow-dividing valve and the work-machine operation valve for changing the oil quantity supplied from the steering gear preference flow-dividing valve to the work-machine operation valve, in accordance with an operation degree signal from the operation degree detection means.

8 Claims, 6 Drawing Sheets

APPARATUS AND METHOD FOR CONTROLLING DISPLACEMENT OF STEERING PUMP FOR WORK VEHICLE

TECHNICAL FIELD

The present invention relates to an apparatus and a method for controlling the displacement of a steering pump for a work vehicle, including a work machine such as a bucket.

BACKGROUND ART

In a hydraulic steering apparatus of a work vehicle, including a work machine such as a bucket, a variable displacement steering pump is generally used so as to decrease the pressure loss. In recent years, a load-sensing type apparatus, for controlling the displacement of such a steering pump, has been employed as an answer to the request of saving energy. In the load-sensing type apparatus, an excessive hydraulic torque is avoided in the manner that the steering pump discharges an oil quantity nearly equal to the oil quantity applied to a steering cylinder in accordance with the rotational speed of a steering handle.

The first background example (a load-sensing type apparatus for controlling the displacement of a steering pump) will be described with reference to FIG. 6. The displacement V (the discharge per revolution) of a variable displacement steering pump 2, driven by an engine 1, is controlled by displacement control means 5, comprising a servo cylinder 3 and a load-sensing valve 4. A steering cylinder 6, for driving the steering system of a work vehicle, is controlled by a steering operation valve 10 disposed between the steering cylinder 6 and the steering pump 2. When a steering spool 12 is rotated with a steering handle 11, so as to open the meter-in opening of the steering operation valve 10 communicating with the steering cylinder 6, the steering cylinder 6 is supplied with oil, discharged from the steering pump 2, through the steering spool 12 and a feedback motor 13, to drive the steering system of the work vehicle. When a steering sleeve 14 is rotated in the same direction as the steering spool 12 by revolving the feedback motor 13 and is located at the same position as the steering spool 12, the supply of oil to the steering cylinder 6 is stopped.

Here, if the steering operation valve 10 is operated, the meter-in opening increases in its opening area to decrease the differential pressure between the front and the rear of the meter-in opening. According to the decrease of the differential pressure between the input pressure and the output pressure of the meter-in opening, the load-sensing valve 4 moves in the direction of the position a, due to the spring force f, to increase the discharge of the steering pump 2. According to the increase in the discharge of the steering pump 2, the differential pressure between the input pressure and the output pressure of the meter-in opening increases to balance with the spring force f of the load-sensing valve 4. In this manner, because the differential pressure between the front and the rear of the meter-in opening is kept constant when the steering valve 10 is operated, the discharge of the steering pump 2, according to the operation speed of the steering operation valve 10, can be obtained.

The engine 1 drives a fixed displacement work-machine pump 9 and a pilot pump 19, which is like the steering pump 2. The fixed displacement work-machine pump 9 drives work-machine cylinders 7 and 8 through work-machine operation valves 17 and 18, independently of the steering pump 2. The pilot pump 19 supplies initial pressures to pilot valves 22 and 23 which generate pilot pressures for operating the work-machine operation valves 17 and 18.

In the second background example (Japanese Unexamined Patent Publication No. 3-186600), oil discharged from a steering pump is made to join in a work-machine hydraulic circuit, so as to be supplied to a work machine, upon operating the work machine. In independently operating a steering system, a variable displacement hydraulic pump therefore discharges an oil quantity required for the steering operation in accordance with the rotational speed of a steering handle regardless of the rate of rotation of an engine, in the range to the maximum discharge of the steering pump, as shown in FIG. 7.

If the work machine is operated at the same time, the discharge of the steering pump becomes the maximum. Oil discharged in proportion to the rate of rotation of the engine is divided preferentially to a steering operation valve in a flow dividing valve and the residual oil is supplied to a work-machine operation valve.

The first background example is a load-sensing type, in which the steering pump 2 merely discharges an oil quantity in accordance with the degree of operation of the steering operation valve 10 regardless of the rate of rotation of the engine 1. It is thus possible to save energy in the middle to high speed range of the engine 1. But in the case of a work vehicle for loading earth and sand, which performs a so-called V-shape operation with switchovers between the forward and backward movements of the vehicle, the engine 1 is controlled at a low speed upon a switchover, to soften the shock due to the switchover and prevent the load from falling out of the bucket. When the rotational speed of the engine 1 is low, the displacement of the steering pump 2 is controlled to the maximum in order to ensure an adequate oil quantity in accordance with the degree of operation of the steering operation valve 10. The variable displacement steering pump thus needs the same pump capacity as a fixed displacement steering pump from the viewpoint that the pump capacity depends upon the oil quantity required when the engine 1 is at a low speed. The variable displacement type pump also causes an increase in cost. Moreover, the work-machine pump 9 employs a large-capacity fixed displacement pump because the steering pump 2 does not assist the work-machine operation valves 17 and 18 with oil. This also causes an increase in cost.

In the second background example, the maximum displacement of the steering pump occurs when the work machine is operated and the steering pump gives a large discharge in proportion to the rate of rotation of the engine. But because the residual oil from the steering operation is supplied to the work-machine operation valve, through a steering gear preference flow-dividing valve, and the discharge of the steering pump can effectively be utilized in a simultaneous operation with the work machine, the total capacity of the steering and work-machine pumps can be decreased in comparison with the first background example so that the cost of both pumps can be decreased. In the case of high oil pressure for the work machine, however, there is a problem in that the work-machine pressure acts on the steering pump and the pressure loss increases upon decreasing the work-machine pressure to the steering pressure.

SUMMARY OF THE INVENTION

It is an object of the present invention to provide an apparatus and a method for controlling the displacement of a steering pump for a work vehicle in which the pressure loss can be decreased and the discharge of the steering pump can effectively be utilized even in a simultaneous operation with a work machine.

In a method of controlling the displacement of a steering pump for a work vehicle according to the present invention, in which an oil quantity only required in accordance with the speed of a steering operation can be supplied to a steering actuator, the discharge of the steering pump is increased in accordance with the degree of the operation of a work-machine operation valve, and the discharged oil quantity, corresponding only to the increase in the discharge, is supplied from the steering pump to the work-machine operation valve.

According to this method, the steering pump supplies the steering actuator with only an oil quantity required in accordance with a steering operation speed. When the work-machine operation valve is operated, the steering pump supplies the work-machine operation valve with only the discharged oil quantity in the discharge in accordance with the degree of the operation of the work-machine operation valve. The capacity of the steering pump may thus be at least the minimum required.

Because the discharge of the steering pump is decreased in comparison with a case in which the displacement of the steering pump becomes the maximum, like the second background example, nonproductive consumption of hydraulic energy, in decreasing the pressure from a work-machine pressure to a steering pressure, can be avoided even in case of a high work-machine pressure. Besides, a hydraulic oil cooler also creates a nonproductive consumption of hydraulic energy which can be made small. Furthermore, even if the capacity of the variable displacement steering pump is the same as or more than that of a usual fixed displacement pump, only a quantity of oil, corresponding to the degree of the operation of the work-machine operation valve, is supplied to the steering pump. The capacity of the work-machine pump can thus be decreased accordingly and a considerable decrease in cost is possible on the whole.

An apparatus for controlling the displacement of a steering pump for a work vehicle according to the present invention includes a variable displacement steering pump; displacement control means for controlling the displacement of the steering pump; a steering actuator for driving a steering system of the work vehicle; a steering operation valve, disposed between the steering pump and the steering actuator; and a work-machine operation valve for operating a work-machine actuator for driving a work machine, wherein the displacement control means is controlled so that the differential pressure between the input pressure and the output pressure of the meter-in opening of the steering operation valve is kept constant. The apparatus also comprises a steering gear preference flow-dividing valve for supplying an oil quantity, discharged from the steering pump, to the steering operation valve so that the differential pressure between the input pressure and the output pressure of the meter-in opening of the steering operation valve is kept constant, and the residual oil quantity is directed to the work-machine operation valve. Further, the apparatus comprises operation degree detection means for detecting a degree of operation of the work-machine operation valve, and a work-machine oil-quantity control valve disposed between the steering gear preference flow-dividing valve and the work-machine operation valve for changing the oil quantity supplied from the steering gear preference flow-dividing valve to the work-machine operation valve, in accordance with an operation degree signal from the operation degree detection means.

According to this construction, a discharged quantity of oil from the steering pump is supplied to the steering operation valve by the steering gear preference flow-dividing valve so that the differential pressure between the input pressure and the output pressure of the meter-in opening of the steering operation valve is kept constant, and quantity of oil, controlled by the work-machine oil-quantity control valve, in accordance with the degree of operation of the work-machine operation valve, is supplied to the work-machine operation valve through the steering gear preference flow-dividing valve. As a result, when the steering operation valve is operated, quantity a of oil, required for keeping the differential pressure between the input pressure and the output pressure of the meter-in opening constant, is discharged from the steering pump in accordance with the operation speed of the steering operation valve. Besides, the quantity of oil to be supplied from the steering pump to the work-machine operation valve, in accordance with the degree of operation of the work-machine operation valve, is controlled by the work-machine oil-quantity control valve.

The capacity of the steering pump is thus sufficient if it contains a sufficient quantity of oil required for the steering operation and a sufficient quantity of oil to be supplied to the work-machine operation valve. As a result, nonproductive consumption of hydraulic energy can be avoided and a hydraulic oil cooler, which is a nonproductive consumer of hydraulic energy, can be made small. Besides, even if the capacity of the variable displacement steering pump is the same as or more than that of a usual fixed displacement pump, only the quantity of oil in the steering pump, corresponding to the degree of the operation of the work-machine operation valve, is supplied. The capacity of the work-machine pump can thus be decreased accordingly and a considerable decrease in cost is possible, on the whole.

According to another aspect of the present invention, the apparatus further comprises selection means for selecting the higher load pressure from the steering load pressure, prior to the meter-in opening of the steering operation valve, and the work-machine load pressure, between the work-machine oil-quantity control valve, and the work-machine operation valve; and displacement control means for controlling the steering oil quantity, so that the differential pressure between the discharge pressure of the steering pump and the selected higher load pressure is kept constant.

According to this construction, the differential pressure between the discharge pressure of the steering pump, and the higher load pressure of the steering load pressure and the work-machine load pressure, is lower than the differential pressure between the discharge pressure and the lower load pressure. This lower differential pressure brings a smaller quantity of oil flowing from the steering pump through the steering gear preference flow-dividing valve and the meter-in opening of the steering operation valve or the opening of the work-machine oil-quantity control valve than the higher differential pressure.

For this reason, when the discharge of the steering pump is controlled with the higher load pressure of the steering load pressure and the work-machine load pressure, wherein the higher load pressure brings the lower differential pressure and a smaller quantity of oil passing, a quantity of oil corresponding to the lower load pressure of the steering load pressure and the work-machine load pressure, wherein the lower load pressure brings the higher differential pressure and a larger quantity of oil passing, is ensured. As a result, because the steering pump discharges at least the minimum amount of oil required, nonproductive consumption of hydraulic energy can be avoided.

DETAILED DESCRIPTION OF THE PREFERRED EMBODIMENTS

Figure 1:
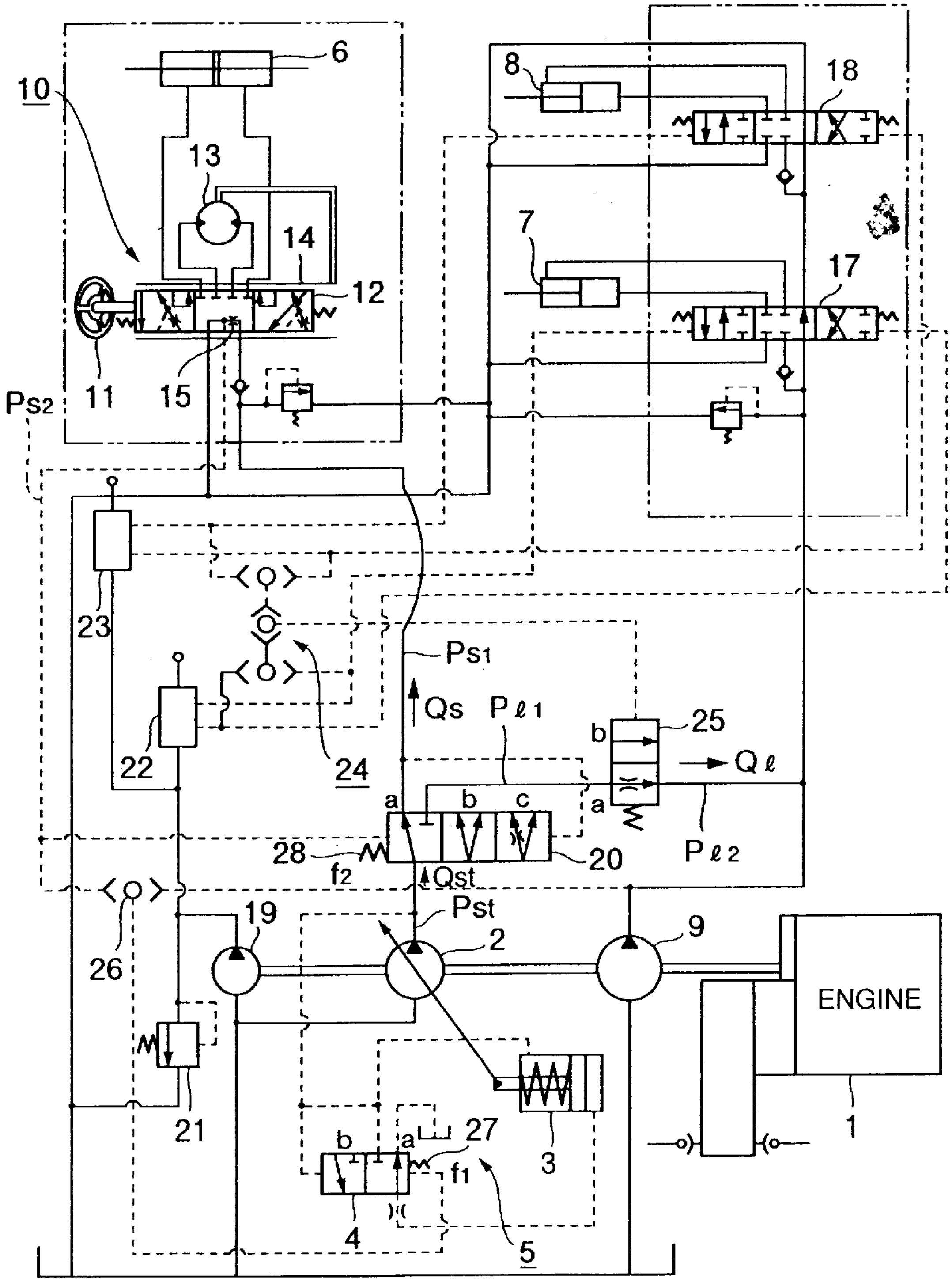
FIG. 1 is a schematic of the construction of an apparatus for controlling the displacement of a steering pump according to a first embodiment of the present invention.

An apparatus for controlling the displacement of a steering pump according to the first embodiment of the present invention will be described in detail with reference to FIG. 1.

A steering gear preference flow-dividing valve 20 is disposed between a steering pump 2 and a steering operation valve 10. The steering gear preference flow-dividing valve 20 divides the discharge of the steering pump 2 preferentially to the steering operation valve 10 so that the differential pressure between the input pressure and the output pressure of the meter-in opening of the steering operation valve 10, communicating with a steering cylinder 6, is a fixed value given by the spring force f2 of the second spring 28 of the steering gear preference flow-dividing valve 20. The oil quantity required, in accordance with the operation speed of the steering operation valve 10, is thereby supplied to the steering operation valve 10. The discharge of a control valve 19 is controlled to a fixed initial pressure by a relief valve 21 and supplied to pilot valves 22 and 23. The degrees of the operations of the pilot valves 22 and 23 (the degrees of the operations of work-machine operation valves 17 and 18) are controlled so that the maximum pilot pressure of the pilot pressures output from the pilot valves 22 and 23 is selected by a shuttle valve group 24 to open the opening of a work-machine oil-quantity control valve 25, disposed between the steering gear preference flow-dividing valve 20 and the work-machine operation valves 17 and 18.

The higher load pressure Ps2 or Pl2 of the steering load pressure Ps2, prior to the meter-in opening of the steering operation valve 10, and the work-machine load pressure Pl2 between the work-machine oil-quantity control valve 25 and the work-machine operation valves 17 and 18, is selected by selecting means 26 (hereinafter called shuttle valve 26) to act on a load-sensing valve 4. The increase or decrease in the discharge of the steering pump 2 is controlled until the differential pressure (Pst−Ps2) or (Pst−Pl2), between the discharge pressure Pst of the steering pump 2 acting on the load-sensing valve 4 and the above higher load pressure Ps2 or Pl2, balances with the spring force f1 of the first spring 27 of the load-sensing valve 4.

Next, the operation of this embodiment will be described.

(1) When the steering operation valve 10 and the work-machine operation valves 17 and 18 are neutral, and the engine 1 is started in the state of FIG. 1, the discharge of the steering pump 2, the displacement of which is the maximum because the load-sensing valve 4 is at the position a, is drained out through the steering gear preference flow-dividing valve 20 and the neutral opening 15 of the steering operation valve 10. The discharge pressure Pst of the steering pump 2, having increased at this time, acts on the load-sensing valve 4 to press the first spring 27. The load-sensing valve 4 thereby moves toward the position b to decrease the displacement of the steering pump 2. The magnitude of the neutral opening 15 is designed so that the generated pressure becomes higher than the discharge pressure Pst at which the displacement of the steering pump 2 is decreased to the minimum. The input pressure Ps1 of the oil discharged from the steering pump 2 at the neutral opening 15 thus becomes larger than the spring force f2 of the second spring 28 of the steering gear preference flow-dividing valve 20 so as to move the steering gear preference flow-dividing valve 20 toward the position c. In this manner, the steering gear preference flow-dividing valve 20 divides the discharge Qst of the steering pump 2 preferentially to supply the steering oil quantity Qs to the steering operation valve 10. The residual work-machine oil quantity Ql is drained out through the position a of the work-machine oil-quantity control valve 25 and the work-machine operation valves 17 and 18.

(2) When the steering operation valve 10 is operated independently, the meter-in opening, communicating with the steering cylinder 6, enlarges to decrease the differential pressure (Ps1−Ps2) between the input pressure Ps1 of the meter-in opening and the steering load pressure Ps2, the differential pressure (Pst−Ps2) between the discharge pressure Pst of the steering pump 2 and the steering load pressure Ps2 decreases. This differential pressure (Pst−Ps2) acting on the load-sensing valve 4 decreases to balance with the spring force f1 of the first spring 27. The load-sensing valve 4 is thereby moved toward the position a to increase the discharge of the steering pump 2.

At the same time, the differential pressure (Ps1−Ps2), acting on the steering gear preference flow-dividing valve 20, decreases to balance with the spring force f2 of the second spring 28. The steering gear preference flow-dividing valve 20 is thereby moved toward the position a to increase the oil quantity to the steering operation valve 10. In this time, (Pst−Ps2)=f1, and (Ps1−Ps2)=f2. Hence, (Pst−Ps1)=(f1−f2). In this manner, the steering gear preference flow-dividing valve 20 divides the discharge Qst of the steering pump 2 preferentially to supply the steering oil quantity Qs to the steering operation valve 10. The residual work-machine oil quantity Ql is drained out through the position a of the work-machine oil-quantity control valve 25 and the work-machine operation valves 17 and 18.

(3) When the work-machine operation valves 17 and 18 are operated independently, they are operated through the pilot valves 22 and 23, the work-machine oil-quantity control valve 25 is moved toward the position b in accordance with the pilot pressures to enlarge the opening of the work-machine oil-quantity control valve 25. When the differential pressure (Pl1−Pl2) between the input pressure Pl1 of the opening of the work-machine oil-quantity control valve 25 and the work-machine load pressure Pl2, thereby decreases, the differential pressure (Pst−Pl2) between the discharge pressure Pst of the steering pump 2 and the work-machine load pressure Pl2 decreases. This differential pressure (Pst−Pl2) acting on the load-sensing valve 4 decreases to balance with the spring force f1 of the first spring 27. The load-sensing valve 4 is thereby moved toward the position a to increase the discharge of the steering pump 2. In this manner, the work-machine oil quantity Ql in the discharge Qst of the steering pump 2 is supplied to the work-machine operation valves 17 and 18 through the steering gear preference flow-dividing valve 20 and the work-machine oil-quantity control valve 25. The residual steering oil quantity Qs is drained out through the steering gear preference flow-dividing valve 20 and the steering operation valve 10.

(4) When the steering operation valve 10 and the work-machine operation valves 17 and 18 are operated at the same time, either of the differential pressure (Pst−Ps2), between the discharge pressure Pst of the steering pump 2 and the steering load pressure Ps2, and the differential pressure (Pst−Pl2), between the discharge pressure Pst of the steering pump 2 and the work-machine load pressure Pl2, decreases in comparison with the neutral state. Although the higher load pressure of the steering load pressure Ps2 and the work-machine load pressure Pl2 is selected by the shuttle valve 26 to act on the load-sensing valve 4 together with the discharge pressure Pst of the steering pump 2, the differential pressure (Pst−Ps2) or (Pst−Pl2) decreases to balance with the spring force f1 of the first spring 27. The load-sensing valve 4 is thereby moved toward the position a to increase the discharge of the steering pump 2.

At the same time, because the differential pressure (Ps1−Ps2) acting on the steering gear preference flow-dividing valve 20 also decreases in comparison with the neutral state, the steering gear preference flow-dividing valve 20 is moved toward the position a till the differential pressure (Ps1−Ps2) balances with the spring force f2 of the second spring 28. The oil quantity to the steering operation valve 10 is thereby increased.

When the steering load pressure Ps2 is greater than the work-machine load pressure Pl2, (Pst−Ps2)<(Pst−Pl2). The higher load pressure Ps2 is then selected and the steering oil quantity Qs is controlled by the load-sensing valve 4 so that (Pst−Ps2)=f1. In this manner, the steering gear preference flow-dividing valve 20 divides the discharge Qst of the steering pump 2 preferentially to supply the steering oil quantity Qs to the steering operation valve 10. The residual work-machine oil quantity Ql is supplied to the work-machine operation valves 17 and 18 through the work-machine oil-quantity control valve 25. In this case, the opening at the work-machine side of the steering gear preference flow-dividing valve 20 is narrowed so that (Pst−Pl1)=(Ps2−Pl2). Hence (Pl1−Pl2)=f1 when the displacement of the steering pump 2 is the maximum or less. The work-machine oil-quantity control valve 25 is thus supplied with an oil quantity nearly equal to the work-machine oil quantity Ql in an independent operation of the work machine. In this manner, because the discharge of the steering pump 2 is controlled with the higher steering load pressure Ps2, the insufficiency of the steering oil quantity Qs can surely be prevented.

When the work-machine load pressure Pl2 is greater than the steering load pressure Ps2, (Pst−Pl2)<(Pst−Ps2). The higher load pressure Pl2 is then selected and the work-machine oil quantity Ql is controlled so that (Pst−Pl2)=f1. In this case, (Pst−Ps2)>f1. But because a control is made by the steering gear preference flow-dividing valve 20 so that (Ps1−Ps2)=f2, the opening at the steering side of the steering gear preference flow-dividing valve 20 is narrowed so that (Pst−Ps1)=(Pl2−Ps2+f1−f2). As a result, an oil quantity nearly equal to the steering oil quantity Qs, in an independent steering operation, is preferentially supplied to the steering operation valve 10.

As described above, in either case of Ps2>Pl2 or Pl2>Ps2, the steering pump 2 discharges the oil quantity Qst=) Qs+Ql), which is the sum of the steering oil quantity Qs and the work-machine oil quantity Ql, wherein the steering oil quantity Qs is preferentially supplied to the steering operation valve 10.

Figure 4:
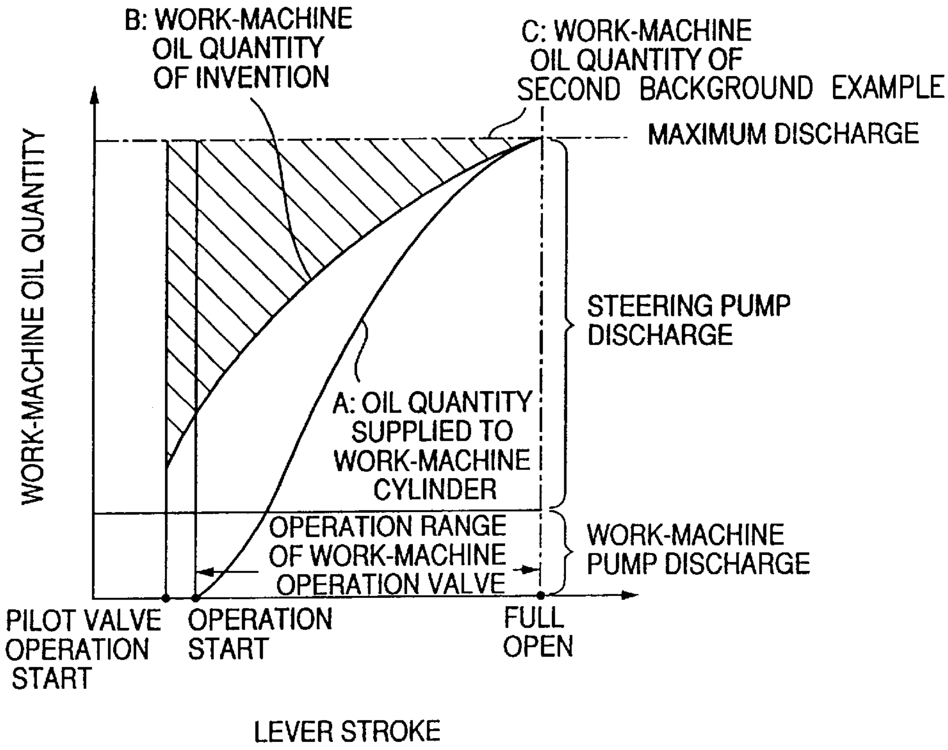
FIG. 4 is a graph comparing the degree of operation and work-machine oil quantity of the present invention to that of the second background example.

Next, the relationship between the lever stroke of the pilot valves 22 and 23 and the work-machine oil quantity supplied to the work-machine operation valves 17 and 18 will be described with reference to FIG. 4.

The horizontal axis represents lever stroke (corresponding to the degrees of the operations of the work-machine operation valves 17 and 18) and the vertical axis represents work-machine oil quantity (including the oil quantity—supplied to the work-machine cylinders 7 and 8). The oil quantity supplied from the work-machine operation valves 17 and 18 to the work-machine cylinders 7 and 8 increases as a curve A in accordance with the increase in the lever stroke. The discharge of the steering pump 2 also increases in accordance with the increase in the lever stroke. The total discharge of the steering pump 2 and the fixed discharge of the work-machine pump 9 increases as a curve B and is supplied to the work-machine operation valves 17 and 18.

In contrast to the second background example, the discharge of the steering pump 2 becomes the maximum when the work machine is operated, and the total discharge of the steering pump 2 and the fixed discharge of the work-machine pump is shown by a straight line C. As a result, in this embodiment, the pressure loss due to the oil quantity, bled off from the work-machine operation valves 17 and 18, can be decreased by the shaded portion in comparison with the second prior art.

Next, a case that an apparatus of this embodiment is applied to a V-shape loading operation of a loading vehicle will be described with reference to FIG. 5.

Figure 5:
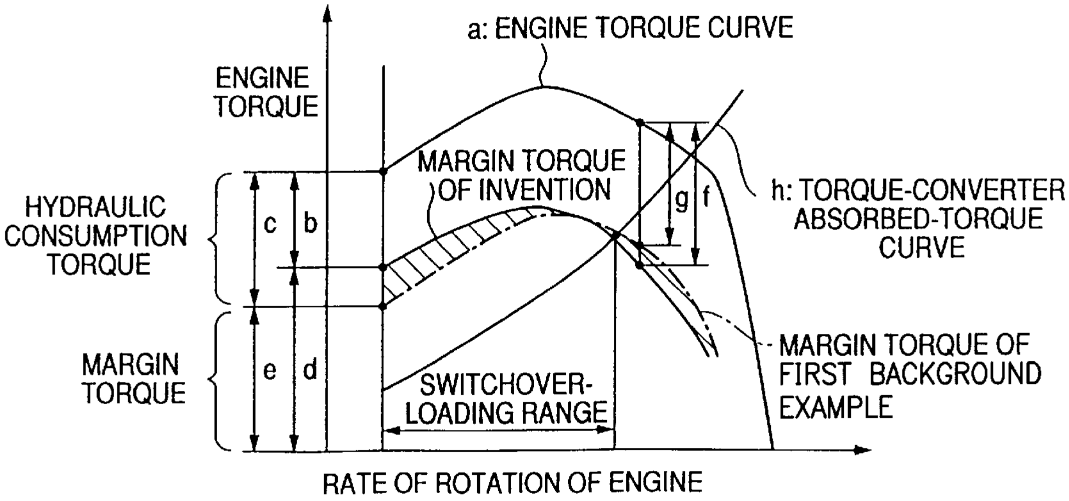
FIG. 5 is a graph comparing the hydraulic consumption torque and margin torque of the present invention to that of the first background example.
Figure 6:
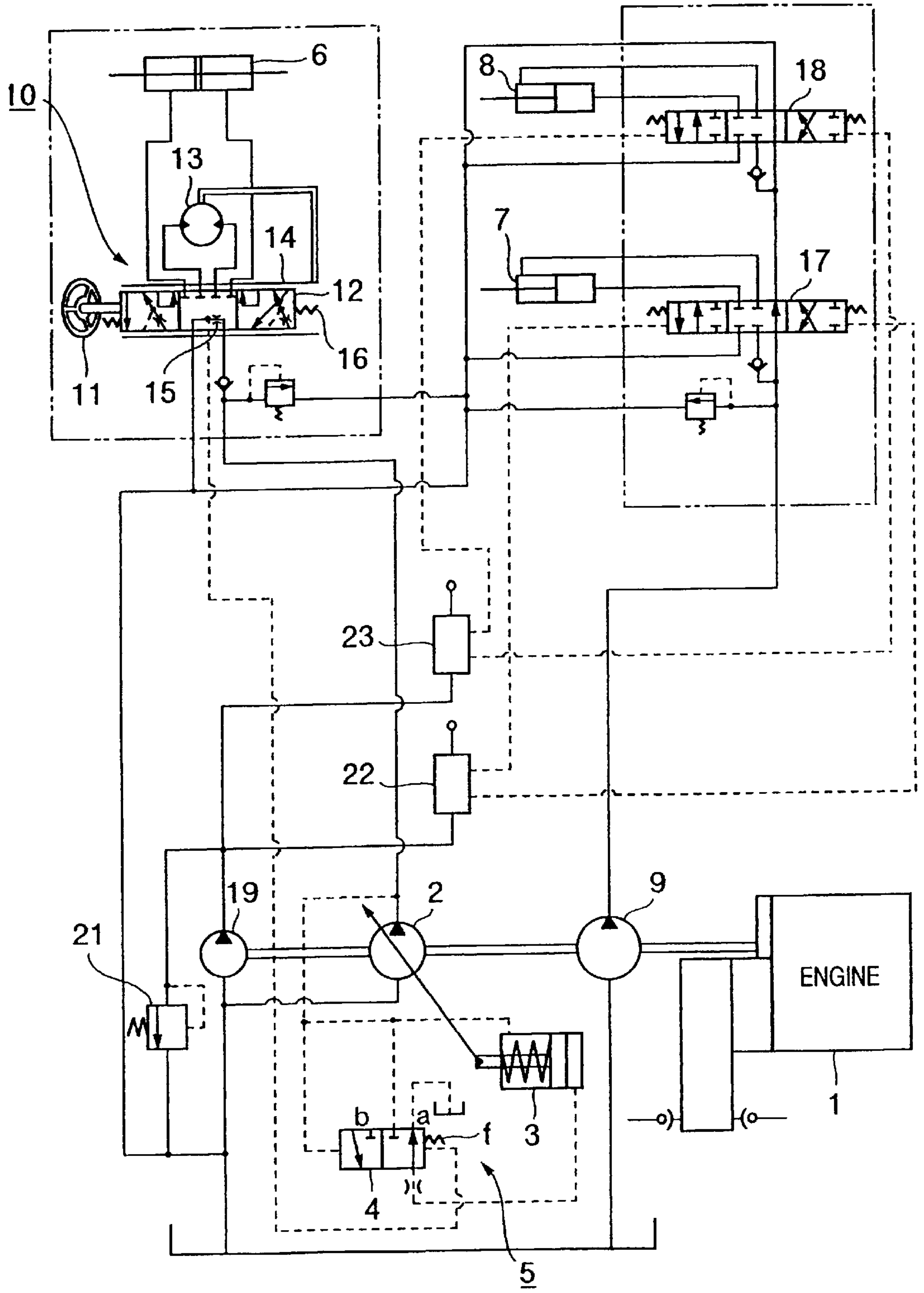
FIG.6 RELATED ART
FIG. 6 is a schematic of the construction of an apparatus for controlling the displacement of a steering pump according to the first background example.
Figure 7:
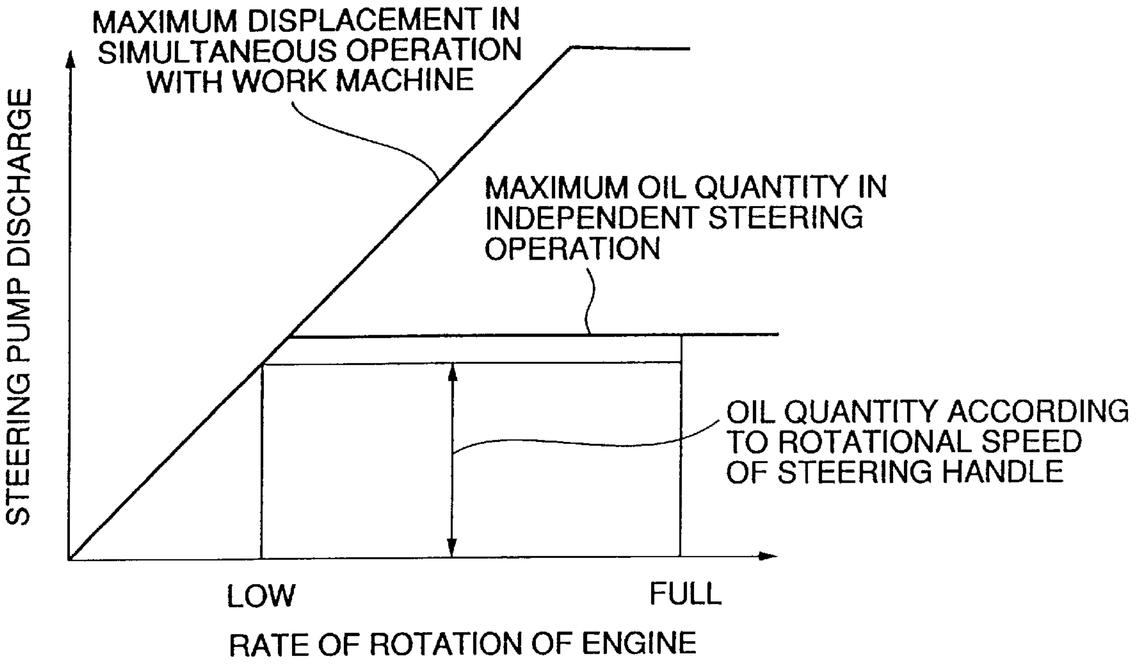
FIG.7 RELATED ART
FIG. 7 is a graph of the discharge of the steering pump of the second background example.

In FIG. 5, the horizontal axis represents the rate of rotation of engine and the vertical axis represents engine torque (including hydraulic consumption torque). After performing a switchover in a loading operation (loading earth and sand into a bucket, backing the vehicle, and then advancing the vehicle toward a dump vehicle), the engine speed is changed from low to high speed, the boom of the work machine is raised, and the vehicle is advanced toward the bed of a dump truck. The engine torque then becomes the maximum in the engine torque curve a. Here, the discharge of the steering pump 2 is divided by the steering gear preference flow-dividing valve 20 so that only the oil quantity corresponding to the rotational speed of the steering handle 11 is supplied to the steering operation valve 10. When the pilot valves 22 and 23 are operated, the oil quantity controlled by the work-machine oil-quantity control valve 25, in accordance with the degrees of the operations of the pilot valves 22 and 23, passes through the steering gear preference flow-dividing valve 20 and the work-machine oil-quantity control valve 25 and joins with the discharge of the work-machine pump 9 to be supplied to the work-machine operation valves 17 and 18.

Because the discharge of the work-machine pump 9 is decreased and the discharge of the steering pump 2 is increased in this embodiment, the total hydraulic consumption torque b, in the work-machine pump 9 and the steering pump 2, is less than the hydraulic consumption torque c in the first background example at a low rotational speed of the engine 1. The speed of the work machine thus becomes low. But because the margin torque d that the hydraulic consumption torque b is subtracted from the engine torque curve a becomes larger than the margin torque e of the first background, the acceleration of the engine increases so the time for completing the raise of the bucket can be shortened.

When the steering operation is not performed, the working speed becomes higher than that of the first background example in the Whole range of the rate of rotation of engine because all of the discharge from the steering pump 2 is utilized for assisting the work-machine operation valves 17 and 18.

Although the hydraulic consumption torque f is larger than the hydraulic consumption torque g of the first background example at a high rotational speed of the engine 1, the speed of the vehicle decreases in accordance with the increase in the working load in the balance rotation range, with the running torque intersecting the absorbed-torque curve h of the torque converter. This advantageously matches the operation feeling of an operator because the operator feels a decrease in the speed of the vehicle, in general, when the working load increases.

Figure 2:
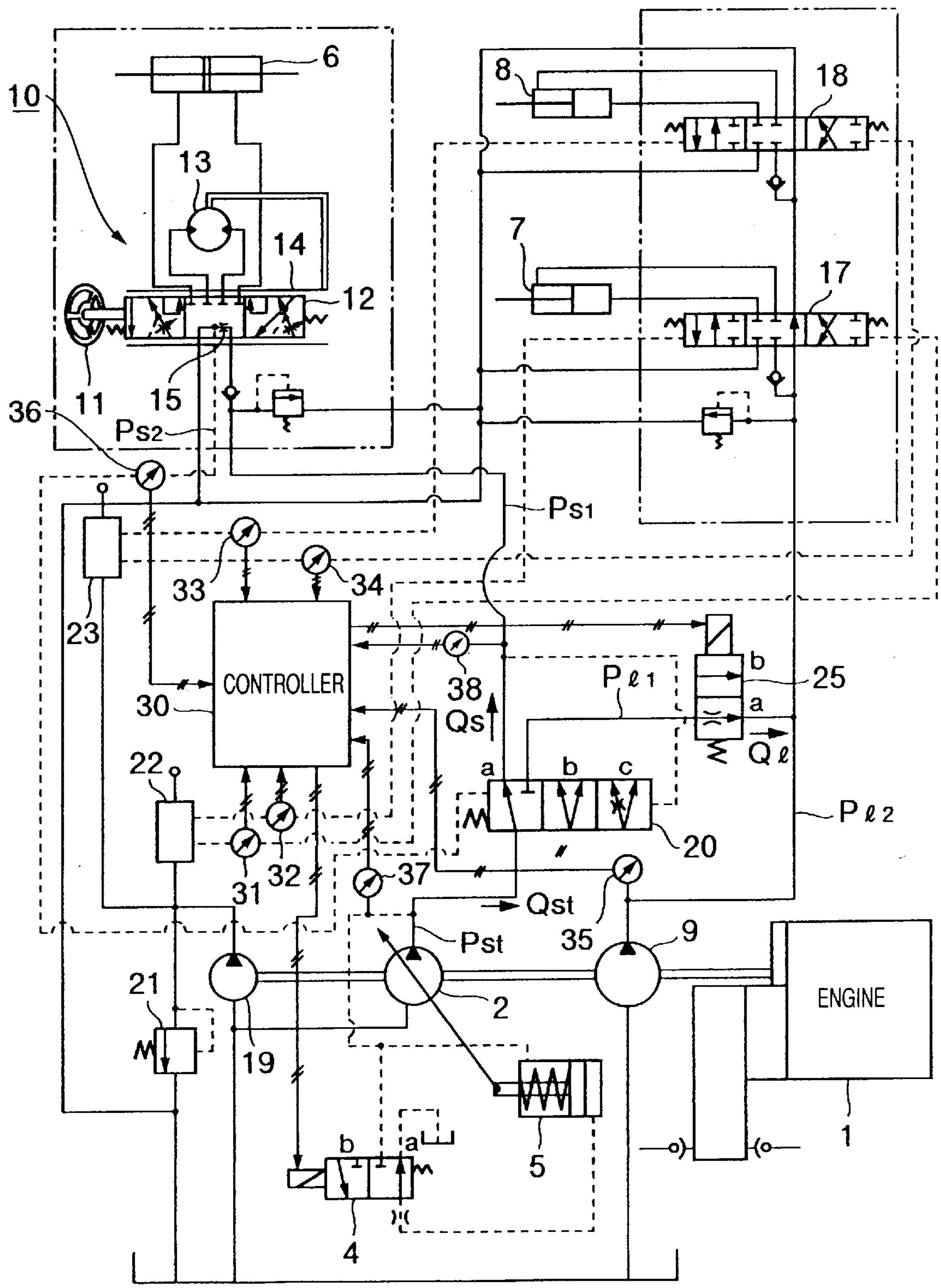
FIG. 2 is a schematic of the construction of an apparatus for controlling the displacement of a steering pump according to a second embodiment of the present invention.
Figure 3:
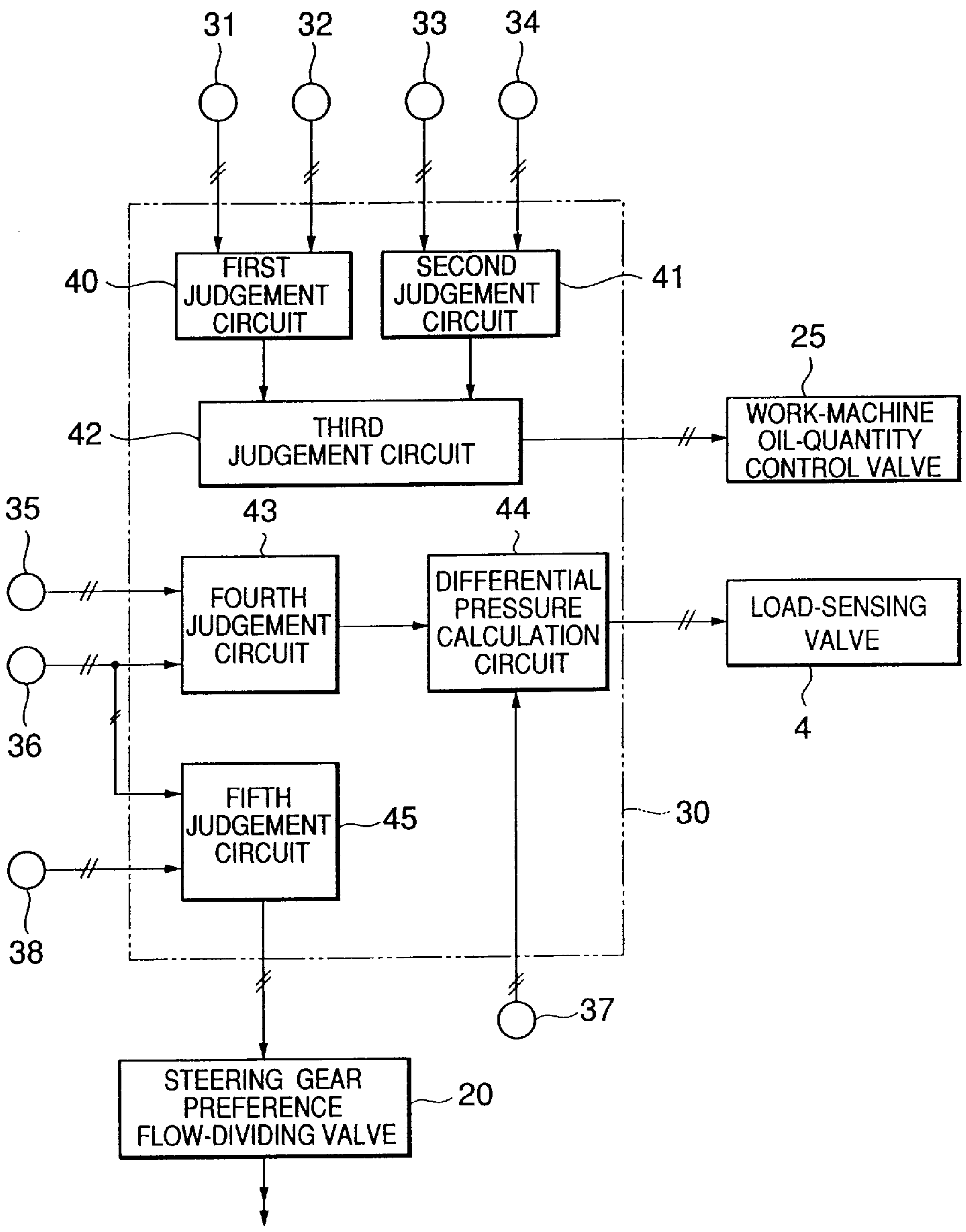
FIG. 3 is a block diagram of the construction of the controller in FIG. 2.

Next, the second embodiment of the present invention will be described with reference to FIGS. 2 and 3. This embodiment differs from the purely hydraulic control in the first embodiment in the point that the load-sensing valve 4 and the work-machine oil-quantity control valve 25 are electrically controlled by making use of a controller. In this second embodiment, the same parts as those of the first embodiment are denoted by the same references as those of the first embodiment and the explanations of them will be omitted.

Degrees of the operations of the pilot valves 22 and 23 (degrees of the operations of the work-machine operation valves 17 and 18) are detected by pilot pressure sensors 31 to 34 with pilot pressures which are operation degree signals outputted by the pilot valves 22 and 23. A work-machine load pressure Pl2, between the work-machine oil-quantity control valve 25 and the work-machine operation valves 17 and 18, is detected by a work-machine load pressure sensor 35. A rear pressure of the neutral opening 15 of the steering operation valve 10 or a steering load pressure Ps2 prior to the meter-in opening is detected by a steering load pressure sensor 36. A discharge pressure Pst of the steering pump 2 is detected by a discharge pressure sensor 37. An input pressure Ps1 of the meter-in opening is detected by a meter-in opening input pressure sensor 38. Detection signals of the sensors 31 to 38 are sent to a controller 30, the detail of which is shown in FIG. 3. The controller 30 makes judgements and calculations in the corresponding circuits therein and then outputs control signals to the load-sensing valve 4, the work-machine oil-quantity control valve 25 and the steering gear preference flow-dividing valve 20 to perform controls.

Next, the operation of this embodiment will be described. The larger pilot pressure of the pilot pressures detected by the pilot pressure sensors 31 and 32 is selected by the first judgement circuit 40 in the controller 30. The larger pilot pressure of the pilot pressures detected by the pilot pressure sensors 33 and 34 is selected by the second judgement circuit 41. The maximum pilot pressure is selected from those larger pilot pressures by the third judgement circuit 42. The work-machine oil-quantity control valve 25 is controlled according to this maximum pilot pressure signal.

The larger load pressure Pl2 or Ps2 of the work-machine load pressure Pl2, detected by the work-machine load pressure sensor 35, and the steering load pressure Ps2, detected by the steering load pressure sensor 36, is selected by the fourth judgement circuit 43, and then input to a differential pressure c alculation circuit 44 together with the discharge pressure Pst of the steering pump 2, detected by the discharge pressure sensor 37. The differential pressure calculation circuit 44 calculates the differential pressure (Pst−Ps2) or (Pst−Pl2) so as to control the load-sensing valve 4 with the obtained differential pressure signal.

The larger load pressure Ps2 or input pressure Ps1 of the steering load pressure Ps2, detected by the steering load pressure sensor 36, and the meter-in opening input pressure Ps1, detected by the meter-in opening input pressure sensor 38, is selected by the fifth judgement circuit 45. The steering gear preference flow-dividing valve 20 is controlled according to the differential pressure of this selected pressure.

Although the present invention has been described with referenced to a presently preferred embodiment, it will be appreciated by those skilled in the art that various modifications, alternatives, variations, etc., may be made without departing from the spirit and scope of the invention as defined in the appended claims.

What is claimed is:

1. An apparatus, for controlling a displacement of a variable displacement steering pump for a work vehicle, comprising:

displacement control means;

a steering actuator for driving a steering system of said work vehicle;

a steering operation valve disposed between said variable displacement steering pump and said steering actuator;

a work machine operation valve for operating a work machine actuator, said work machine actuator for driving a work machine;

a steering gear preference flow-dividing valve for supplying a quantity of oil from a discharge from said variable displacement steering pump to said steering operation valve;

operation degree detection means for detecting a degree of operation of said work machine operation valve; and a work machine oil-quantity control valve, disposed between said steering gear preference flow-dividing valve and said work machine operation valve, for changing said quantity of oil supplied from said steering gear preference flow-dividing valve to said work machine operation valve in accordance with an operation degree signal from said operation degree detection means, wherein said displacement control means controls said displacement so that a differential pressure, between an input pressure and an output pressure of a meter-in opening of said steering operation valve is kept constant; and wherein a residual quantity of oil is supplied to said work machine operation valve.

2. An apparatus, for controlling a displacement of a variable displacement steering pump for a work vehicle, as claimed in claim 1, wherein said displacement control means comprises a servo cylinder and a load-sensing valve.

3. An apparatus, for controlling a displacement of a variable displacement steering pump for a work vehicle, as claimed in claim 1, further comprising selection means for selecting a higher load pressure from a steering load pressure, prior to said meter-in opening of said steering operation valve, and a work machine load pressure, between said work machine oil-quantity control valve and said work machine operation valve, wherein said displacement control means controls said displacement so that a differential pressure between a steering pump pressure and said selected higher load pressure is kept constant.

4. An apparatus, for controlling a displacement of a variable displacement steering pump for a work vehicle, as claimed in claim 3, wherein said displacement control means comprises a servo cylinder and a load-sensing valve.

5. An apparatus, for controlling a displacement of a variable displacement steering pump for a work vehicle, as claimed in claim 3, wherein said selection means comprises a shuttle valve.

6. A method, for controlling a displacement of a variable displacement steering pump for a work vehicle, comprising the steps of:

increasing a discharge quantity of oil from said variable displacement steering pump in accordance with a degree of operation of a work machine operation valve;

supplying a quantity of oil, corresponding only to the increase in the discharge quantity of oil, to said work machine operation valve.

7. A method, for controlling a displacement of a variable displacement steering pump for a work vehicle, as claimed in claim 6, further comprising the step of controlling said discharge quantity so that a differential pressure, between an input pressure and an output pressure of a meter-in opening of a steering operation valve, is kept constant.

8. A method, for controlling a displacement of a variable displacement steering pump for a work vehicle, as claimed in claim 6, further comprising the steps of:

selecting a higher load pressure from a steering load pressure, prior to a meter-in opening of a steering operation valve, and a work machine load pressure, between a work machine oil-quantity control valve and said work machine operation valve; and controlling said displacement so that a differential pressure between a steering pump pressure and said selected higher load pressure is kept constant.

* * * * *